June 24, 1924.

H. H. EDGE

UNIVERSAL JOINT

Filed Nov. 12, 1921

1,498,685

Inventor
Howard H. Edge.

By T. Clay Lindsey.
His Attorney

Patented June 24, 1924.

1,498,685

UNITED STATES PATENT OFFICE.

HOWARD H. EDGE, OF BRIDGEPORT, CONNECTICUT, ASSIGNOR TO R. E. CARPENTER, RECEIVER OF THE HARTFORD AUTOMOTIVE PARTS COMPANY, OF HARTFORD, CONNECTICUT, A CORPORATION OF CONNECTICUT.

UNIVERSAL JOINT.

Application filed November 12, 1921. Serial No. 514,548.

*To all whom it may concern:*

Be it known that I, HOWARD H. EDGE, a citizen of the United States, and a resident of Bridgeport, in the county of Fairfield and State of Connecticut, have invented certain new and useful Improvements in Universal Joints, of which the following is a specification.

The present invention relates to universal joints and has as its object to provide a device of this sort having various features of novelty and advantage, and which is particularly characterized by its simplicity and strength in construction and its efficiency in operation, and wherein the bearing surfaces, which are subject to wear, are maintained in a perfectly lubricated condition.

In the accompanying drawings—

Figure 1:
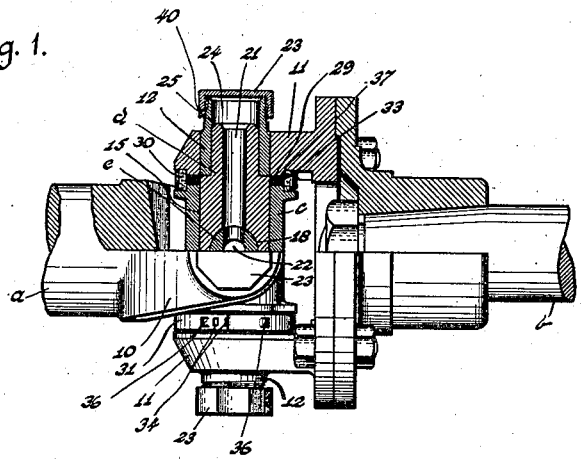
Fig. 1 is a side elevation of a complete joint, partly in section.

The structure includes the usual shaft sections $a$, $b$, which are in the form of yokes or forks, the arms of which are respectively indicated by the numerals 10 and 11. The arms 11 of yoke $b$ are provided with alined apertures into which are forced hardened steel bushings 12. The arms 10 of the other yoke $a$ are similarly apertured and receive hardened bushings 13 provided adjacent their inner ends with flanges 14.

$c$ is a center block having openings 15 and 16 intersecting at right angles. Positioned in the larger of these openings, 16, is a pin $d$ having a central portion of like diameter as the opening 16 and end portions of reduced diameter fitting within the bushings 12. Fitting within the smaller opening 15 and extending through a transverse aperture 18 in the central portion of the larger pin $d$, is a straight pin $e$ the ends of which are received by the bushings 13.

The respective pins $e$, $d$, have axial holes 21 and 22 running through them from end to end, and these holes intersect, as shown. Threaded on the outer ends of the bushings 12, 13, are oil caps 23 which form oil chambers 24 at the outer ends of the pins and within the bushings 12 and 13. Preferably, the outer ends of the pins have their external corners chamfered or cut away, so as to provide the chambers 24 with annular pockets or recesses 25 below the outer ends or tips of the pins.

It will be seen, with the arrangement so far described, that an oil cup or chamber is provided at each end of each pin and these cups have communication with each other through the holes in the pins $d$, $e$. The holes in the pins serve as a reservoir for the lubricating oil, and oil may be supplied thereto in any position in which the universal joint may stand. When the universal joint is rotated, the oil, owing to centrifugal force, will be thrown outwardly into the oil cups and, due to the pressure set up, will be forced between the bearing surfaces on the pins and bushings, thus maintaining the same in proper lubricated condition. The pockets 25 at the upper ends of the pins, when the joint is brought to a stop, will hold some lubricating oil which will leak down between the pins and the bushings, thus maintaining these bearing surfaces in lubricated condition.

For the purpose of preventing the lubricant from escaping through the joints 29 at the inner ends of the bushings 12 and 13, packing rings 30, secured in place by removable clamps 31, are provided. These packing rings are positioned in circumferential grooves 33 formed in part in the center block and in part in the bushings 13 or in the arms 11. Thus, the packings 30 overlie and extend to each side of the joints 29. Each packing 30 is preferably in the form of a strip which may be positioned in the groove 33 without disassembling the joint. The clamping members 31 are removable. They may comprise a strip of metal, one end of which is provided with spaced openings 34 and the other end having a tongue 35 which takes into the openings. Adjacent each end of the strip is a projection or lip 36 which may be gripped by a wrench or the like so as to draw the clamp tightly together while it is being fastened in place. It will be seen that the clamp, together with the packing, may be very readily replaced when the packing becomes worn. The clamps are adjustable to suit conditions. If desired, a hardened steel or metallic washer 37 of a different density than the block and yoke may be interposed between the arms 11 and the center block so as to prevent scoring.

Figure 2:
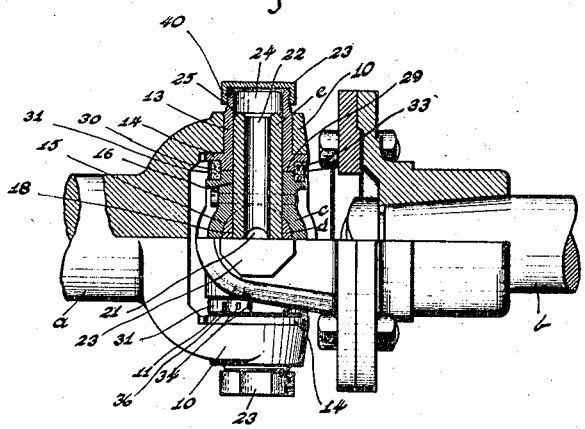
Fig. 2 is a view similar to Fig. 1 showing the same parts but turned at an angle of 90°.
Figure 4:
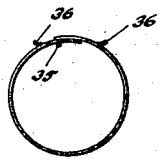
Fig. 4 is a view of a ring employed for clamping a packing in place.
Figure 3:
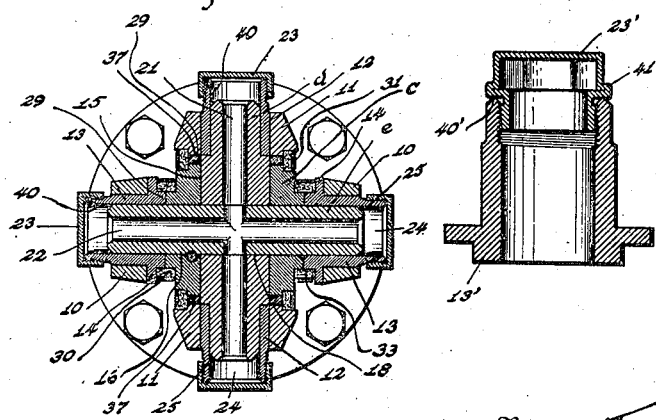
Fig. 3 is a sectional view on the line 3—3 of Fig. 1 looking in the direction of the arrow.
Figure 5:
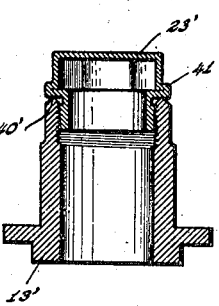
Figs. 5 and 6 are detail views showing modified forms of oil caps.
Figure 6:
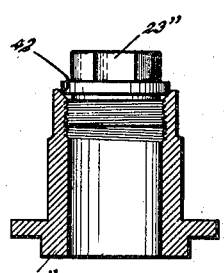

For the purpose of preventing the oil from leaking out between the respective caps and bushings, one of these members is provided with a sharp edge which is adapted to bite into the other member. In the embodiment shown in Figs. 1, 2 and 3, the outer end of each bushing is formed with a sharp edge 40 adapted to be imbedded in the cap 23 which is of relatively softer material. In the embodiment of Fig. 5, the cap 23' screws into the bushing 13' and the sharp edge 40' of the latter engages the flange 41 of the cap. In Fig. 6, the cap 23" has a sharp edge 42 which engages the bushing 13".

I claim as my invention:—

1. A device of the character described comprising a pair of shaft members having apertures disposed at right angles, a bushing part fitted in each of said apertures, pivot studs positioned in said bushing parts, and an oil cap part in threaded engagement with each bushing part, one of said parts having a sharp edge adapted to engage the other part to form a tight fluid joint therebetween.

2. A device of the character described comprising a pair of shaft members having apertures disposed at right angles, bushings fitted in said apertures, pivot studs positioned in said bushings, and oil caps in threaded engagement with said bushings, said bushings terminating at their outer ends in sharp annular edges adapted to bite into said caps when the latter are screwed into place.

3. A device of the character described comprising a pair of shaft members having bearing openings disposed at right angles, a connecting member having pivot studs positioned in said openings, a joint between said connecting member and the shaft members adjacent the inner end of each of said bearing openings, a removable packing fitting about and overlapping to each side of each joint, and removable clamps for securing the packings in place.

4. A device of the character described comprising a pair of shaft members having bearing openings disposed at right angles, a connecting block engaging said shaft members adjacent the inner ends of said openings, pivot studs carried by said connecting block and positioned in said bearing openings, circumferential grooves encircling the joint between the contacting faces of said connecting block and shaft members, each groove being formed in part in the shaft member and in part in the connecting block, a packing in each circumferential groove, and means for securing each packing in place.

5. A device of the character described comprising a pair of shaft members having bearing openings disposed at right angles, a center block, pivot studs carried by said center block and positioned in said bearing openings, washers positioned between and having a different density than said blocks and shaft members, a circumferential groove encircling each washer, each groove being formed in part in the shaft member and in part in the connecting block, a packing in each circumferential groove, and a clamping member for each packing comprising a metallic strip having spaced openings at one end and a tongue in the other end adapted to engage in any one of said openings.

6. A device of the character described comprising a pair of shaft members each having a pair of arms provided with apertures, the apertures in one pair of arms being disposed at right angles to the apertures in the other pair of arms, a bushing positioned in each aperture, a center block positioned between the shaft members and abutting against the inner ends of the bushings in one pair of arms, a circumferential groove about each joint formed by the contacting faces of said bushings and center block, a removable packing in each groove, a removable clamping member about said packing, and a pair of hollow pins in said block with their ends fitting in said bushings.

HOWARD H. EDGE.